(12) United States Patent
Waddleton

(10) Patent No.: US 6,494,232 B2
(45) Date of Patent: Dec. 17, 2002

(54) MODULAR PROTECTIVE SLEEVE FOR UNDERGROUND UTILITIES

(76) Inventor: Lawrence F. Waddleton, 50 Moffatt Drive, Brampton, Ontario (CA), L6Y 2M8

( * ) Notice: Subject to any disclaimer, the term of this patent is extended or adjusted under 35 U.S.C. 154(b) by 1 day.

(21) Appl. No.: 09/853,687

(22) Filed: May 14, 2001

(65) Prior Publication Data

US 2002/0166594 A1 Nov. 14, 2002

(51) Int. Cl.[7] .............................. F16L 9/00; F16L 9/22
(52) U.S. Cl. ........................ 138/98; 138/110; 138/157; 138/155
(58) Field of Search ............................ 138/98, 97, 110, 138/157, 155, 177, 178, 105

(56) References Cited

U.S. PATENT DOCUMENTS

| | | | | |
|---|---|---|---|---|
| 263,627 A | * | 8/1882 | Thayer | 138/108 |
| 695,478 A | * | 3/1902 | McGeorge | 138/151 |
| 1,002,932 A | * | 9/1911 | Richards | 138/108 |
| 1,014,549 A | * | 1/1912 | Wilson | 138/105 |
| 1,203,768 A | * | 11/1916 | Moore | 138/102 |
| 1,298,258 A | * | 3/1919 | Richards | 138/105 |
| 1,499,954 A | * | 7/1924 | Stiles | 138/157 |
| 1,541,918 A | * | 6/1925 | Brennan | 138/105 |
| 1,638,428 A | * | 8/1927 | Zander | 138/100 |
| 1,787,907 A | * | 1/1931 | Hutson | 138/157 |
| 1,823,819 A | * | 9/1931 | Crampton | 138/157 |
| 1,974,337 A | * | 9/1934 | Magnani | 138/157 |
| 1,987,517 A | * | 1/1935 | Porter et al. | 138/111 |
| 2,005,699 A | * | 6/1935 | Gottwald | 138/106 |
| 4,314,775 A | * | 2/1982 | Johnson | 138/105 |
| 4,967,800 A | * | 11/1990 | Heilmayr et al. | 138/128 |
| 5,125,199 A | * | 6/1992 | Whitney et al. | 138/157 |
| 6,247,500 B1 | * | 6/2001 | McMahon | 138/157 |

FOREIGN PATENT DOCUMENTS

CA    2059776    7/1992

* cited by examiner

Primary Examiner—Patrick Brinson

(57) ABSTRACT

A modular protective sleeve for underground utilities may be pulled into an underground utility duct by using lanyards extending between two adjacent manholes through the utility duct. The modular protective sleeve may be assembled over an existing and active utility service such as electrical or telephone cables, optical cables, or gas lines, without disrupting the utility service. The protective sleeve comprises at least one bottom half-shell and two top half-shells which are interlocked on to another in such a way that they may be pulled in either direction. Once the protective sleeve is in place, the concrete casing surrounding the utility duct may be broken without danger to the utility service, after which repair or splicing to the utility can be carried out. The sleeve may then be retrieved for re-use, or left in place.

14 Claims, 9 Drawing Sheets

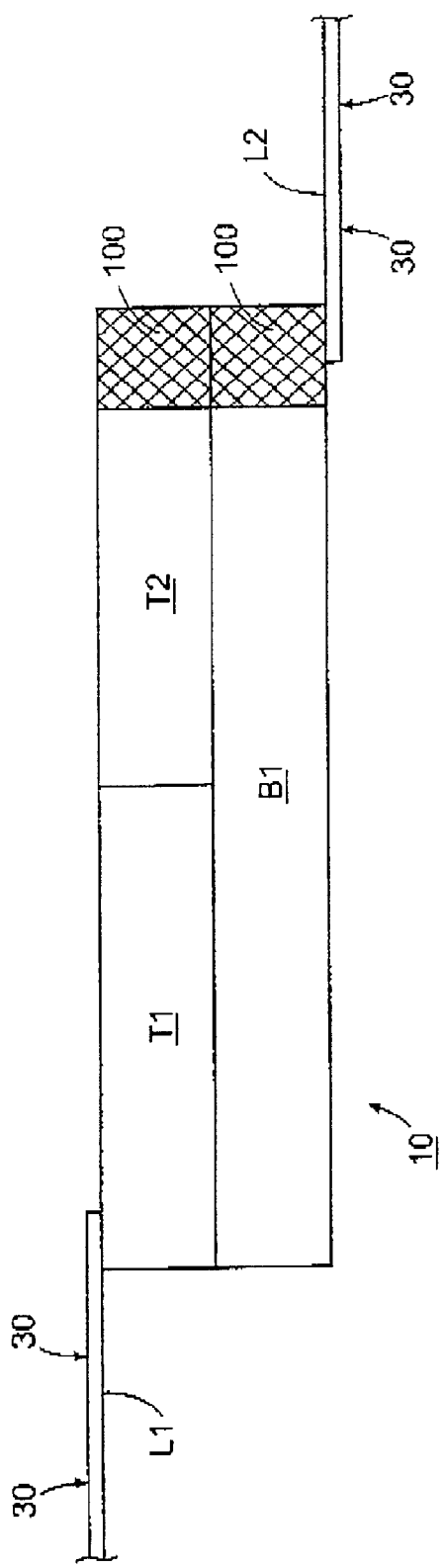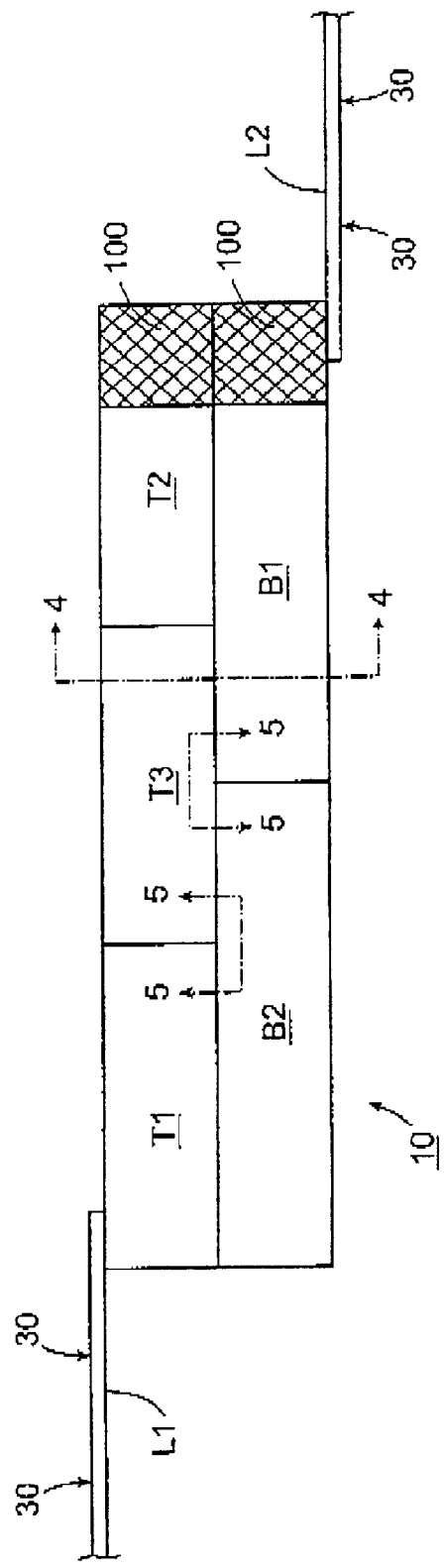

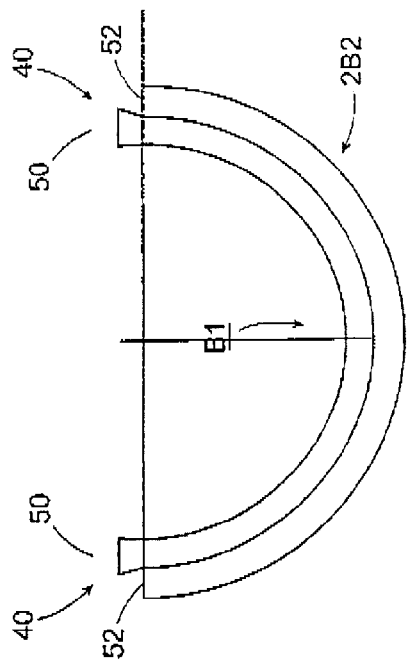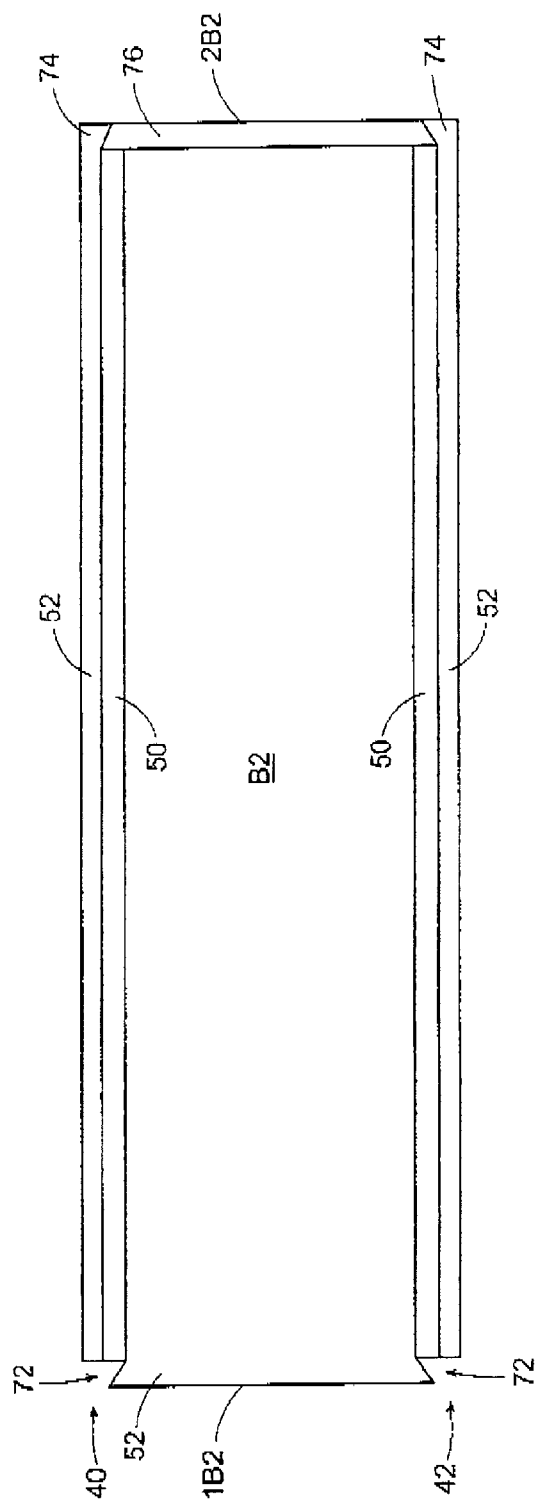

MODULAR PROTECTIVE SLEEVE FOR UNDERGROUND UTILITIES

FIELD OF THE INVENTION:

This invention relates to protective sleeves for underground utilities, and particularly to modular protective sleeves which can be put into place by being hauled or dragged through a utility duct which runs between two adjacent manholes, so as to be positioned within the duct and to protect the utility which the modular protective sleeve surrounds while the casing in which the duct is placed is broken.

BACKGROUND OF THE INVENTION

Most countries in the world, developed and developing, western and eastern, including third world countries, may have many underground utilities that have been put into place or will be put into place in the near future. This is especially true in urban areas of nearly every country, and in many suburban areas particularly of European, North American, Southeast Asian, Australasian, some South American, and some Asian subcontinent cities. Such underground utilities include electrical power distribution utilities, telephone and cable television distribution utilities, other high speed data distribution utilities including particularly optical fibre transmission and distribution systems, and gas distribution systems. All of those utilities are typically buried underground in urban and many suburban areas for reasons of safety, convenience, so as to avoid tampering, so as to avoid urban visual blight, and so on.

Typically, such underground utilities are referred to as buried utilities, and typically they are installed in plastic ducts which are, themselves, surrounded and protected by a concrete casing or barrier. Such ducts are buried at depths from several centimeters up to several meters below the surface, and they range in diameter from, say, 10 cm up to 40 cm or more.

Also, buried utilities that are run in ducts are typically found in ducts which extend in straight lines between adjacent manholes. This provides an opportunity to "fish" a line or fishtape, or the like, from one manhole to the next adjacent manhole, a feature which the present invention takes advantage of.

It will also be noted that, in most instances, there is some clearance around any utility cables, wiring, or piping, that is carried through a duct—in other words, the duct is not packed full—and that is also a feature of which the present invention takes advantage, as will be described hereafter.

However, any buried utility of the sort described above is liable at some time or another to have a fault, whereby wires may short together or insulation may break down, a pipe may collapse, and so on; and in any such instance, it is necessary to dig into the ground at the point where the fault has occurred so as to correct it.

Moreover, it very often occurs that a repair such as a splice or a branch must be installed in or taken from the underground utility, at a particular location. This again requires digging into the ground so as to reach the buried utility at the desired spot.

However, as it has been noted, most such underground utilities are encased in a concrete protective casing which requires to be broken such as by jackhammers or sledge hammers. Typically, jackhammers are used for that purpose.

Obviously, however, the use of a jackhammer in the immediate region of a utility duct creates considerable danger to the utility duct because it is possible that, as the last few centimeters of concrete are broken through by the jackhammer, the point of the jackhammer might pierce into the utility duct. It will be borne in mind that the utility duct is, itself, typically made of plastic such as PVC or the like, having relative hardness and stiffness, but not nearly enough to withstand the slightest impact of a jackhammer.

The purpose of the present invention is to provide a modular protective sleeve which can be positioned inside the underground utility duct at the point where the concrete casing surrounding the duct is to be broken. Then, as the last few centimeters of concrete are broken away and the point of the jackhammer approaches the duct, even if it pierces the plastic material of the duct it will simply glance or bounce or slide off the hard metallic protective sleeve which has been put into position in the place where the jackhammer work is to be done. This protects the utility, so that it may continue to work in an operative manner delivering whatever commodity it is that is within the utility duct.

Thus, a very particular need arises for a modular protective sleeve which can be put into position at a place where the concrete casing which surrounds a buried utility duct is to be broken so as to gain access to the utility within that duct, without disturbing the delivery of the utility commodity.

Typically, a modular protective sleeve in keeping with the present invention may have a length of 30 cm or 40 cm and up to several meters, depending on the nature of the digging and concrete breaking activity that is to be undertaken. The purposes for varying lengths of modular protective sleeve are manifold, including the fact that if a fault has occurred it may not be possible to precisely locate its position within, say, a few centimeters. Moreover, it may sometimes occur that a length of duct of several meters or more may be required to be exposed in order to permit utility workers to gain access to the specific utility so as to repair it, splice into it, take a branch from the utility, or whatever other task is required.

However, manholes are typically not very large. A manhole having room for two or three workers may be all that is available, or even smaller, and as such the manhole may have a diameter of not more than 1.5 meters or so. Accordingly, in order to install a protective sleeve somewhere along the length of the duct stretching from that manhole to an adjacent manhole, requires modularity so that the required length of sleeve may be put into place—even though the working space within the manhole might be quite small.

On the other hand, because ducts between adjacent manholes generally run in a straight line, and the distance between the manholes is known; and also because it is possible to fish a tape or line through the duct from one manhole to the adjacent manhole, it is possible to quite accurately position a modular protective sleeve in keeping with the present invention by the use of lanyards which extend from each end of the modular protective sleeve to a respective one of the adjacent manholes, in the manner described hereafter.

It should also be noted that the modular protective sleeve in keeping with the present invention may be assembled without the necessity for any special tools, and without the necessity for hinged structures and the like. The disassembly of modular protective sleeves in keeping with the present invention, when required and appropriate, may be carried out at the site where the utility repair is to take place, because in any event it is necessary to remove the modular protective sleeve away from the utility which it has been protecting after the surrounding concrete casing has been broken away. Of course, it may also be possible to pull the modular protective sleeve back into one or the other of the adjacent manholes which define the length of duct into which the modular protective sleeve has been placed, if necessary or appropriate.

Any modular protective sleeve in keeping with the present invention must be sufficiently strong and rugged to withstand handling in a manhole, and particularly to withstand the shock of a sledge hammer or jackhammer striking it during the course of breaking away the concrete casing which surrounds the utility duct. Accordingly, modular protective sleeves in keeping with the present invention are generally constructed of a strong metal such as case hardened steel, although they may be constructed of aluminum in some circumstances as well.

On the other hand, because a modular protective sleeve in keeping with the present invention does not represent a particularly high capital cost, there are some circumstances—such as when it is necessary to protect a splice or bypass on a gas line or electrical distribution cable—where once the modular protective sleeve has been put into place it is left in place.

If so, the modular protective sleeve may, itself, be cathodically protected so as to preclude cathodic erosion thereof.

So as to make assembly easy, particularly when a modular protective sleeve in keeping with the present invention is used on a temporary basis, and will be re-used again on another job, and because the modular pieces of the modular protective sleeve tend to look like one another except upon close examination, various distinctive elements may be color coded or are otherwise identifiable due to a specific structural feature, particularly the attachment point for the lanyard which is to be secured at each end of the assembled modular protective sleeve, when in place.

As will be noted hereafter, the modularity of the present invention allows for assembled modular protective sleeves to be put into position at any point along a utility duct, where the assembled modular protective sleeve may comprise as few as three modular elements, having a length equal to the longest of those modular elements—as described hereafter—or it may comprise a plurality of modular elements—ranging from 5 up to as many as 11 to 15 elements—thereby having a length which is an integral multiple of the length of any of the modular elements.

It will also be noted that two of the top elements—one of which is mounted at each end of an assembled modular sleeve—each have one-half the length of the other modular elements which are employed, particularly the first bottom half-shell element, as described hereafter.

Each of the modular elements, on both the top and bottom of the assembled modular protective sleeve, are interlocked one to another so that when they are assembled, a tensile relationship may be established between them. Moreover, because there is a double-acting stop arrangement which is provided at one end of the assembled modular protective sleeve, the use of one lanyard at each end of the assembled modular protective sleeve permits movement of the assembled modular protective sleeve along the utility duct in either direction using the lanyards which are connected, one to the top elements and one to the bottom elements of the assembled modular protective sleeve.

These, and other features and advantages of the modular protective sleeve in keeping with the present invention are described hereafter.

DESCRIPTION OF THE PRIOR ART

A plastic cable protection sleeve which is fitted around the cable such as a wire rope or hawser, for the cable to pass through when it is towing or mooring a ship is known in Canadian Published Patent Application No. 2,059,776, published Jul. 23, 1992, in the name of Bingham. The structure comprises two half shells which, however, are keyed or hinged together. In any event, as noted, the purpose of this plastic protection sleeve is to protect a cable as it passes over a rail of a ship.

SUMMARY OF THE INVENTION

The present invention provides a modular protective sleeve which may be employed in ducts for underground utilities, so as to protect the underground utility during a period of time when the casing around the utility is being broken. The modular protective sleeve comprises a first bottom half-shell which has a first length, first and second ends, and upper edges. The first bottom half-shell has a semi-cylindrical configuration with walls which terminate at the upper edges along the length of the first bottom half-shell.

The modular protective sleeve also comprises first and second top half-shells each of which have a length of one-half the length of the first bottom half-shell. Each of the first and second top half-shells has first and second ends, and lower edges, each of the first and second top half-shells also having a semi-cylindrical configuration with walls which terminate at the lower edges along the length of each of the first and second top half-shells.

The upper edges of the first bottom half-shell each have a stepped configuration, and the lower edges of each of the first and second top half-shells also each have a stepped configuration, but in the opposite sense of the stepping of the first bottom half-shell. Thus, when the first and second top half-shells are placed over the first bottom half-shell, the respective stepped configuration of the upper and lower edges nest into one another so as to form a sleeve having a cylindrical configuration.

The second end of the first top half-shell has a hook-like configuration so as to have a vertically directed hook and an adjacent recess formed therein, in a first vertical direction. The first end of the second top half-shell also has a hook-like configuration, so as to have a vertically directed hook, and an adjacent recess formed therein, in a second vertical direction which is opposite to the first vertical direction. Thus, when the second end of the first top half-shell and the first end of the second top half-shell are placed together, they nest into one another in such a manner that a tensile relationship between them may be established.

Attachment means are provided for a lanyard at each of the second end of the first bottom half-shell and the first end of the first top half-shell.

Stop means are provided at the second end of the second top half-shell in a manner such that the stop means interferes with the end of one of the steps on each of the upper edges of the first bottom half-shell so as to preclude sliding motion of the second top half-shell over the first bottom half-shell beyond a position where the second end of the second top half-shell overlies the second end of the first bottom half-shell.

The above description is of a modular protective sleeve which comprises three elements: two top half-shells, and one bottom half-shell. However, as noted above, the length of the modular protective sleeve in keeping with the present invention may be extended by the addition of further top and bottom half-shells, as now described.

Thus, the modular protective sleeve of the present invention may further comprise at least one second bottom half-shell and at least one third top half-shell, where an equal number of additional bottom half-shells and additional third top half-shells are provided. Each of the at least one second bottom half-shell and each of the at least one third top half-shell have identical lengths. Each has a first end, a second end, and respective upper and lower edges. Moreover, each of the at least one second bottom half-shell and each of the at least one third top half-shell has a semi-cylindrical configuration with walls which terminate at the respective upper and lower edges along the lengths thereof.

The upper edges of each of the at least one second bottom half-shell each have a stepped configuration which is identical to that of the first bottom half-shell.

Also, the lower edges of each of the at least one third top half-shell each have a stepped configuration which is identical to those of the first and second top half-shells.

Thus, each of the first, second, and third top half-shells will nest with the first and second bottom half-shells so as to form an elongated sleeve having a cylindrical configuration.

Each first end of each of the first bottom half-shell and the at least one second bottom half-shell, and each first end of the at least one third top half-shell, has a hook-like configuration so as to have a vertically directed hook and an adjacent recess formed therein in the first vertical direction, as defined above. Also, each second end of each of the at least one second bottom half-shell, and each second end of the at least one third top half-shell, has a hook-like configuration so as to have a vertically directed hook and an adjacent recess formed therein in the second vertical direction, which is opposite to the first vertical direction.

Thus, when any one of the at least one second bottom half-shell is assembled together with the first bottom half-shell, they nest into one another in such a manner that a tensile relationship between them may be established. Further, when any one of the at least one third top half-shell is assembled together with at least the first and second top half-shells, they nest into one another in such a manner that a tensile relationship among them may be established.

In the first embodiment of the present invention, having three elements, the stepped configuration of the upper edges of the first bottom half-shell and the stepped configuration of the lower edges of the first and second top half-shells, may be such that they present an interlocking relationship so as to preclude vertical separation of the first bottom half-shell away from the first and second top half-shells.

Indeed, in any embodiment of the present invention, the stepped configuration of the upper edges of all of the first and second bottom half-shells, and the stepped configuration of the lower edges of all of the first, second, and third top half-shells, may be such that they present an interlocking relationship so as to preclude vertical separation of the first and second bottom half-shells away from the first, second, and third top half-shells.

Also, in any embodiment of the present invention, a first lanyard is attached to the first end of the first top half-shell, and a second lanyard is attached to the second end of the first bottom half-shell, respectively. Thus, the modular protective sleeve of the present invention may be pulled lengthwise in either of a first and second lengthwise direction, by tension being applied to either of the first and second lanyards, respectively.

Typically, the lanyards are calibrated along their length into units of length.

In any embodiment of the present invention, the first bottom half-shell or any second bottom half-shell which may be employed may have a first distinctive colour applied to the inner surface of its semi-cylindrical configuration. Also, each of the first and second top half-shells, and any third top half-shell which may be employed, may have a second distinctive colour applied to the inner surface of each respective semi-cylindrical configuration thereof. The first and second distinctive colours are mutually distinctive one from the other.

Further, there may be a band of a third mutually distinctive colour which is applied to the outer surface of the semi-cylindrical configuration of each of the first bottom half-shell and the second top half-shell, at the respective second end of each.

Any embodiment of the present invention may be formed from a metal such as steel or aluminum.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which:

FIG. 2 schematically illustrates a first embodiment of the present invention;

FIG. 3 schematically represents a further embodiment of the present invention, employing a plurality of half-shell elements;

FIG. 10 is an end view taken from the second end of a second bottom half-shell element in keeping with the present invention;

FIG. 11 is a top view of a second bottom half-shell element;

DETAILED DESCRIPTION OF THE PREFERRED EMBODIMENTS

The novel features which are believed to be characteristic of the present invention, as to its structure, organization, use and method of operation, together with further objectives and advantages thereof, will be better understood from the following discussion.

Figure 1:
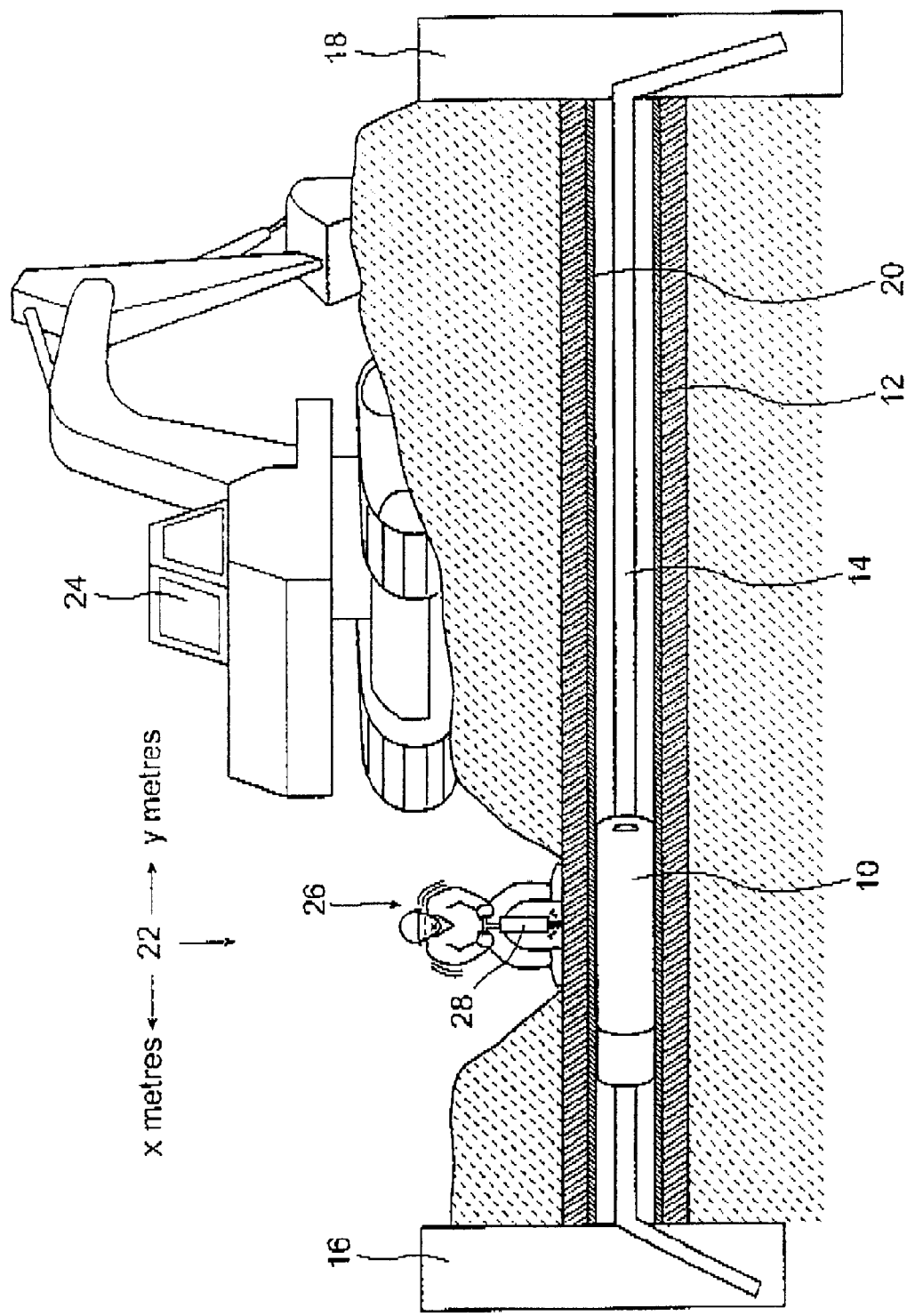
FIG. 1 is illustrative of the circumstances wherein a modular protective sleeve in keeping with the present invention may be employed.

A typical situation where the modular protective sleeve for underground utilities as taught by the present invention finds specific use, is in a situation such as that which is illustrated in FIG. 1. Here, a modular protective sleeve assembly, shown at 10, has been put into position within a utility duct 12, through which a utility service 14 extends. For purposes of illustration, the utility service 14 is shown as extending from manhole 16 to manhole 18. The utility duct 12 is surrounded by a poured concrete casing 20.

For some reason or other—perhaps there has been a failure in the utility 14, or perhaps there is a requirement to splice into the utility 14 to divert a subsidiary service away from that utility to a new customer, or other reasons—it is, in any event, required to break into the utility duct 12 to access the utility 14 at a specific location 22. The utility duct 12 and its concrete casing 20 are, buried below the ground, so an earth digging machine such as a power shovel or back hoe, shown at 24, has been employed to excavate at the location 22 so as to expose the concrete casing 20. Then, a worker 26, equipped with a jackhammer 28, descends into the excavation to break the concrete casing 20 at that location 22. (In some instances, the utility may be above ground in a concrete casing or a utilidor, but otherwise the purpose, use, and function of the modular protective sleeve are as described herein.)

It is determined that the location 22 is X meters away from manhole 16, and Y meters away from manhole 18.

As the jackhammer 28 breaks the concrete 20, it will eventually reach the utility duct 12. At that point, if the modular protective sleeve 10 were not in place, there is a great risk that the jackhammer 28 would break into the duct 12 and possibly contact the utility feed 14. This could create disruption to the service being provided by the utility; and it could also create extreme danger to the worker 26 and others in the surrounding area. For example, if the utility 14 is a gas line, great care must be taken not to break that line. If the utility is an underground electrical cable—which typically may be at 44,000 volts—then extreme danger to the worker 26 exists if, while the worker is well grounded standing in the bottom of an excavation, the jackhammer 28 should contact a high voltage line.

If the utility is a major telephone distribution cable or data transmission optical cable, and it is broken, then a widespread service disruption could occur.

Thus, the modular protective sleeve 10 is put in position so that, when the jackhammer 28 reaches the vicinity of the utility duct 12, it will just glance or slide or bounce off the modular protective sleeve 10, without damage to the utility 14. Of course, the utility duct 12 will be damaged at that point; but it would have to be cut or opened so as to gain access to the utility by utility workers, which is the object of the job in any event.

As will be discussed hereafter, the modular protective sleeve 10 has been put into position in the first instance by lanyards (not shown in FIG. 1, but discussed hereafter) which are attached to the modular protective sleeve 10, one at each end thereof and on the bottom and top regions thereof, also as described hereafter. Typically, a lanyard is fished from, say, manhole 18 through to manhole 16, the modular protective sleeve 10 is assembled in manhole 16, and is then pulled into place within the utility duct 12 so as to be in a position which is Y meters from manhole 18, and X meters from manhole 16.

To achieve that positioning, the lanyards are calibrated as to length, with markings placed thereon; and, of course, at least one of the lanyards is longer than X plus Y meters.

Thus, after the lanyard which extends from manhole 18 to manhole 16 has been put into place and attached to the modular protective sleeve 10, the lanyard is pulled back towards the manhole 18 for X meters, so as to thereby put the modular protective sleeve 10 into position.

Of course, the above discussion neglects the actual length of the modular protective sleeve 10, which may be as little as 40 cm or 50 cm or which may be 1 or 2 meters, and the appropriate adjustments are made accordingly in taking the measurement readings from the respective lanyards which determine the positioning of the modular protective sleeve 10.

Typically, especially where a fault in the utility 14 has occurred, its exact location may not be possible to be determined with greater accuracy than 50 cm or 1 meter, or so; but once the concrete casing 20 has been broken and the utility duct 12 is cut open so as to gain access to the utility 14, it may be a simple matter to slightly re-position the modular protective sleeve 10, if necessary, to continue breaking the concrete casing 20.

In its simplest embodiment, the modular protective sleeve 10 comprises three pieces, which are shown in FIG. 2. They are a first bottom half-shell B1, a first top half-shell T1, and a second top half-shell T2. Each of those modular half-shell elements is discussed in greater detail hereafter. However, each modular half-shell has a first end and a second end; for purposes of this discussion, the first end is considered to be that end which is at the left end of any element as seen in FIG. 2 or 3, the second end being that end of the half-shell elements which is at the right end thereof as seen in FIGS. 2 and 3.

The lanyards which are attached to the modular protective sleeve are attached at the first end of the first top half-shell T1, as shown by lanyard L1; and at the second end of the first bottom half-shell B1, as shown at lanyard L2.

In any modular protective sleeve embodiment which, in keeping with the present invention, is elongated beyond the three fundamental half-shell elements, two additional half-shell elements are employed as shown in FIG. 3. They are a second bottom half-shell element B2, and a third top half-shell element T3.

In order to make the embodiment shown in FIG. 3 longer, additional second bottom half-shell elements B2 are added at the left end of the modular protective sleeve, and additional third top half-shell elements T3 are added in the middle of the assembly, between the top half-shell elements T1 and T2.

Calibrations for units of length are printed or otherwise associated with the lanyards L1 and L2, as indicated by arrows 30.

The assembly of any configuration or embodiment of modular protective sleeve in keeping with the present invention requires that the first top half-shell element T1 will be assembled to a bottom half-shell element B2 or B1, depending on the length of assembly to be constructed, with the last bottom half-shell element to be put into place being B1, and the last top half-shell element to be put into place being T2.

Figure 4:
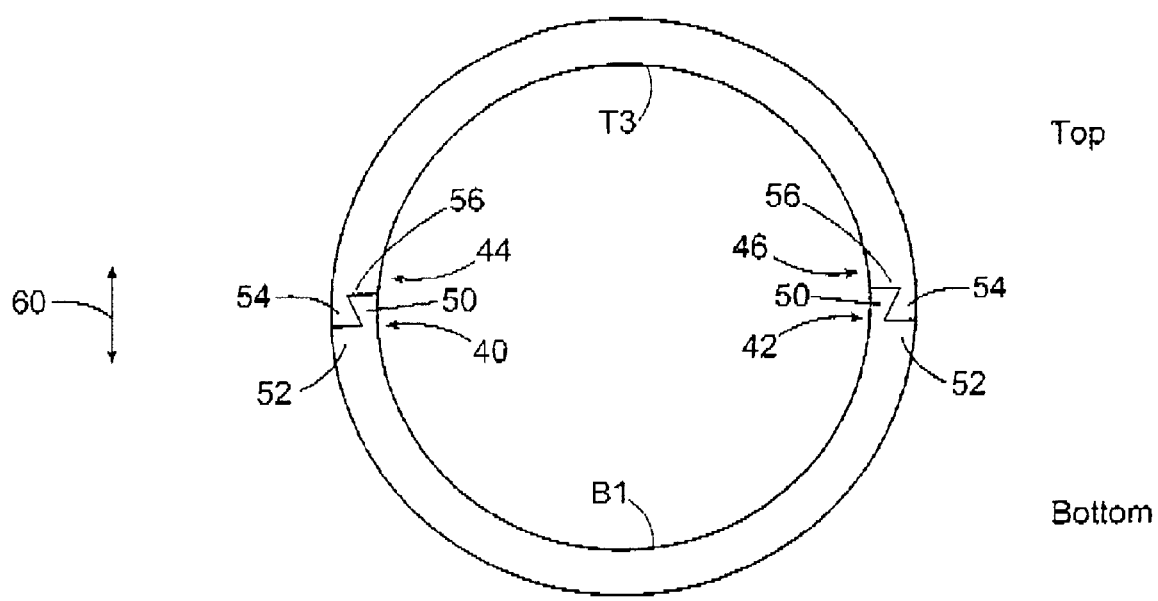
FIG. 4 is a typical cross-section taken in the direction of arrows 4—4 in FIG. 3

When bottom and top half-shell elements are assembled together in keeping with the present invention, a modular protective sleeve having a cylindrical configuration is constructed as shown in FIG. 4, since each of the bottom half-shell elements and each of the top half-shell elements has a semi-cylindrical configuration. The precise elements which are shown in FIG. 4 are a T3 top half-shell element and a B1 bottom half-shell element, but all of the elements have the same cross-section except the second end of the second top half-shell element of T2, as described hereafter.

Figure 5:
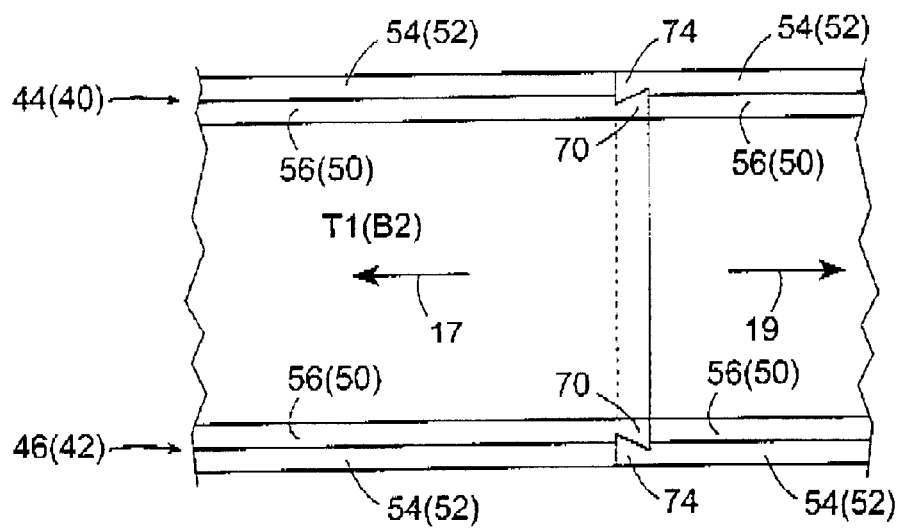
FIG. 5 shows a typical interlocking connection between half-shell modular elements in the direction of either of sets of arrows 5—5 in FIG. 3.

A typical interconnection between adjacent top or bottom half-shell elements is shown in FIG. 5, and will be discussed hereafter. It will be seen from the following discussion that the interconnection between adjacent top half-shell elements or bottom half-shell elements is such that a tensile relationship between them may be established, so that tensile force as illustrated by arrows 17 and 19 in FIG. 5, which are directed in opposite directions one to the other, may be established between the respective bottom half-shell elements or top half-shell elements, so that they may be pulled into place using the lanyards L1 and L2.

Figure 6:
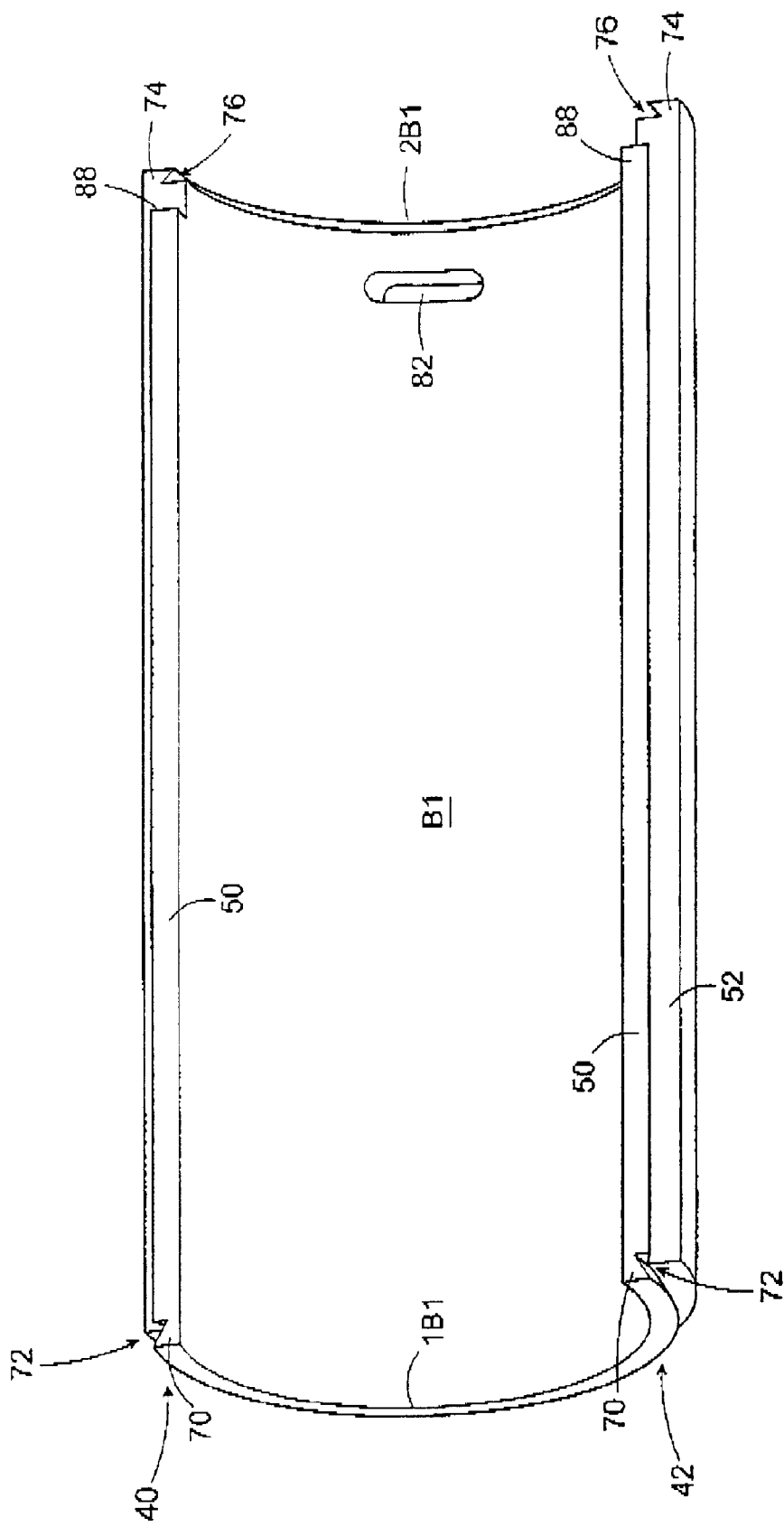
FIG. 6 is an isometric view of a first bottom half-shell element.
Figure 7:
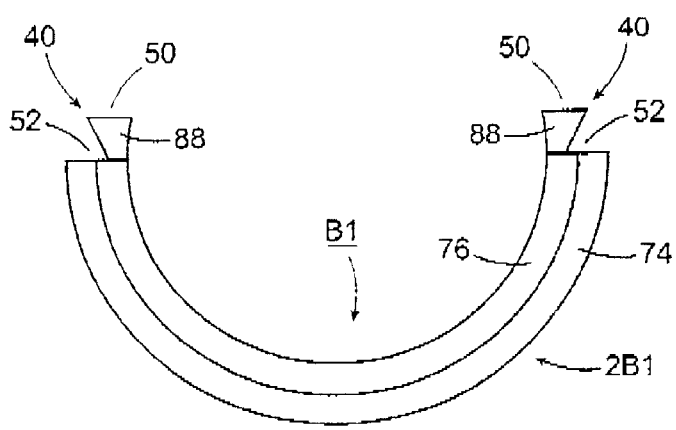
FIG. 7 is an end view of the first bottom half-shell element of FIG. 6, taken from the second end thereof.

Referring to FIG. 6, a perspective view of the first bottom half-shell element B1 is shown. The bottom half-shell element B1 has a first length, which may be typically 40 cm or 50 cm, or more, or less. The half-shell element B1 has first and second ends 1B1 and 2B1, respectively, and it has upper edges which are shown generally at 40 and 42, and a semi-cylindrical configuration as seen in FIG. 7. As noted in FIG. 7, the semi-cylindrical configuration terminates at the upper edges 40 and 42, along the length of the bottom half-shell element B1.

Throughout this discussion, common features of varying half-shell elements will be identified by the same reference numerals.

As noted in FIG. 2, the fundamental embodiment of the modular protective sleeve for the present invention also comprises first and second top half-shell elements T1 and T2. They are illustrated in FIGS. 12 to 14, and FIGS. 15 to 17, respectively.

Each of the first and second top half-shell elements T1 and T2 has a length which is one-half the length of the first bottom half-shell element B1, as can be seen by reference to FIG. 2. Each of the first and second top half-shell elements T1 and T2 has respective first and second ends 1T1, 2T1, and 1T2, 2T2, respectively. Each of the half-shell elements T1 and T2 has lower edges 44, 46; and as seen in FIGS. 13, 14, 16, and 17, each of the first and second top-half shell elements T1 and T2 has a semi-cylindrical configuration with walls which terminate at the lower edges 44 and 46, along the length of each of those first and second top half-shell elements T1 and T2.

As can be seen in any of FIGS. 4 through 8, the upper edges 40, 42 of the first bottom half-shell B1 have a stepped configuration, comprising steps 50 and 52. Also, the lower edges 44, 46 of the first and second top half-shell elements T1 and T2 each have a stepped configuration comprising steps 54 and 56, with the steps 54 and 56 being stepped in the opposite sense of the stepping of the first bottom half-shell B1.

As can be seen particularly in FIG. 4, the stepping of the upper and lower edges of the bottom and top half-shell elements, respectively, is such that they will nest into one another so as to form a sleeve which has a cylindrical configuration. Steps 50 and 56 face each other, and steps 52 and 54 face each other.

The steps may be essentially vertical, or they may be slanted in such a way as to present an interlocking relationship which is shown in the Figures, whereby vertical separation of the top half-shell elements and the bottom half-shell elements is precluded. The directions in which vertical separation forces might occur are shown by double-headed arrow 60 in FIG. 4.

Still further, with the exception of the first end 1T1 of the first top half-shell element T1, the second end T2T of the second top half-shell element T2, and the second end 2B1 of the first bottom half-shell element B1, hook-like configurations are formed in the ends of the various half-shell elements employed by the present invention.

Specifically, with respect to the simple embodiment as shown in FIG. 2, there is a requirement for a hook-like configuration to be formed at the second end 2T1 of the first top half-shell element T1. The hook-like configuration is sometimes identified as a male hook, and is common to both the top half-shell elements and the bottom half-shell elements, except at opposite ends thereof.

Figure 12:
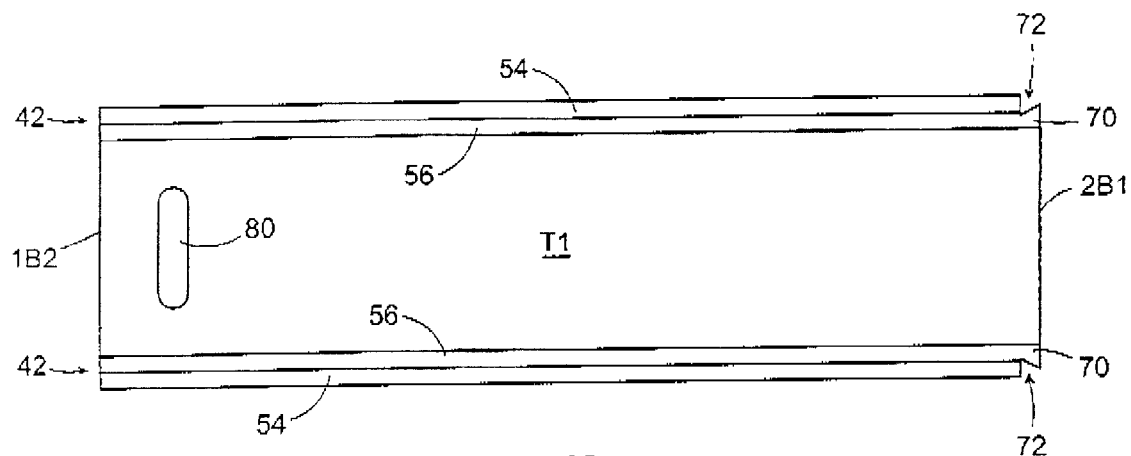
FIG. 12 is a view of a first top half-shell element, taken from the bottom thereof.
Figure 13:
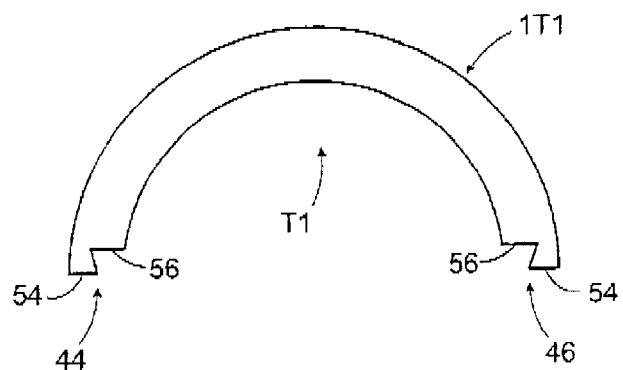
FIG. 13 is an end view of a first top half-shell element, taken from the first end thereof.
Figure 14:
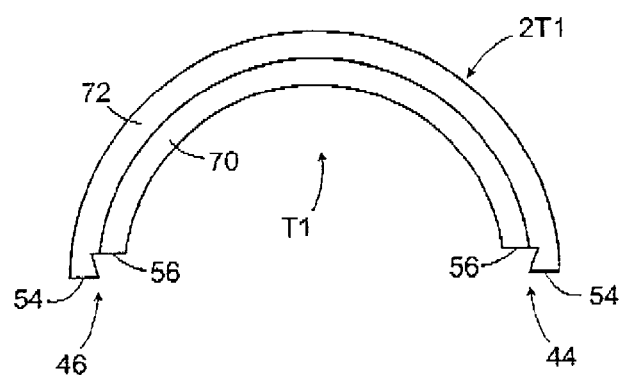
FIG. 14 is an end view of a first top half-shell element, taken from the second end thereof.

In any event, as seen in FIG. 12, the hook-like configuration has a vertically directed hook 70, and an adjacent recess 72. The recess 72 is formed in a first vertical direction.

Also, the second top half-shell element T2 has a hook-like configuration which has a vertically directed hook 74 and an adjacent recess 76 which is formed in a second vertical direction opposite to the first vertical direction. That configuration at the second end 1T2 of the second top half-shell element T2 is referred to as a female end of the half-shell elements.

As can be seen in FIG. 5, the hooks 70 and 74 interact with one anther, into the respective recesses 72 and 76, so that when they are placed together in the manner shown in FIG. 5 they nest into one another in such a manner that a tensile relationship between them may be established.

It should be obvious that the same relationship holds with respect to any of the top half-shell elements which are placed adjacent to one another, and with respect to any of the bottom half-shell elements which are placed adjacent to one another.

Attachment means are provided for the lanyards L1 and L2 at each of the first end 1T1 of the first top half-shell element T1, and the second end 2B1 of the first bottom half-shell element B1. Those attachment means are typically slots, as shown at 80 and 82, respectively.

Figure 8:
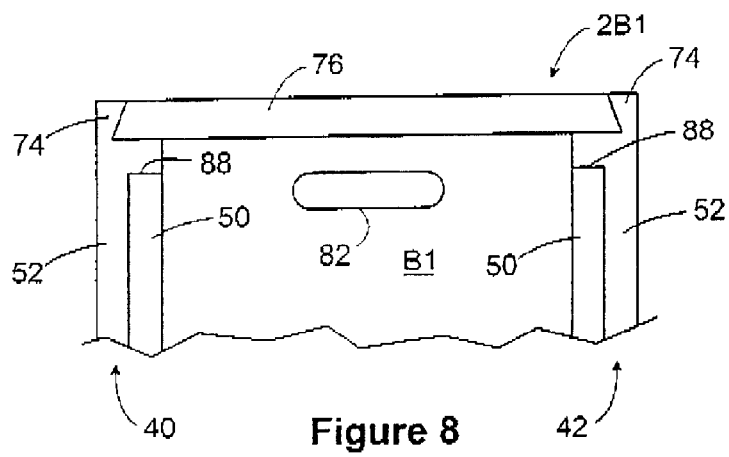
FIG. 8 is a top view of the second end of a first bottom half-shell element.
Figure 9:
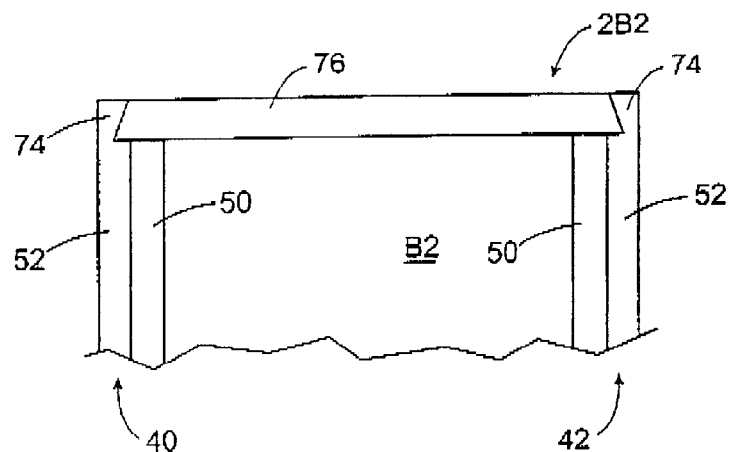
FIG. 9 is a top view of the second end of a second bottom half-shell element.
Figure 15:
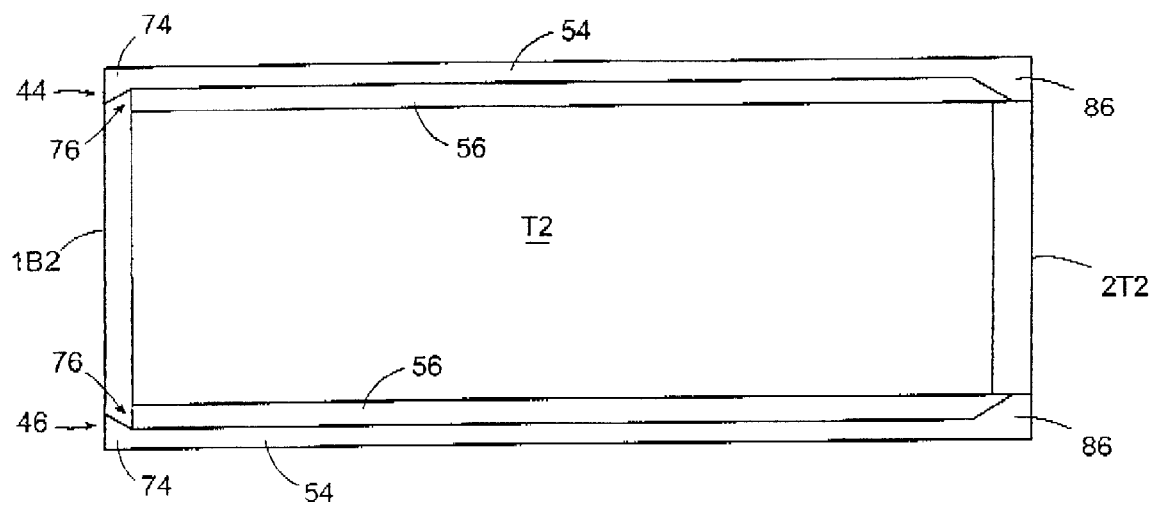
FIG. 15 is a view of a second top half-shell element, taken from the bottom thereof.
Figure 16:
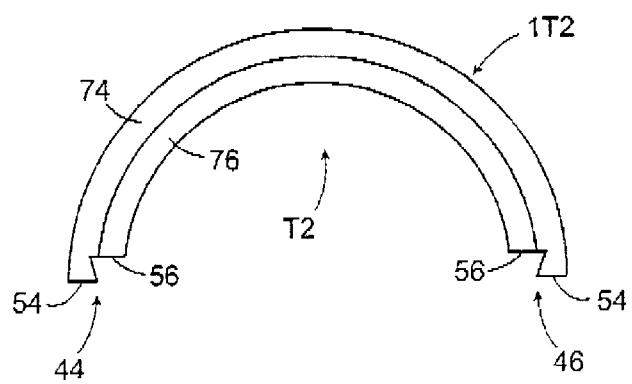
FIG. 16 is an end view of a second top half-shell element, taken from the first end thereof.
Figure 17:
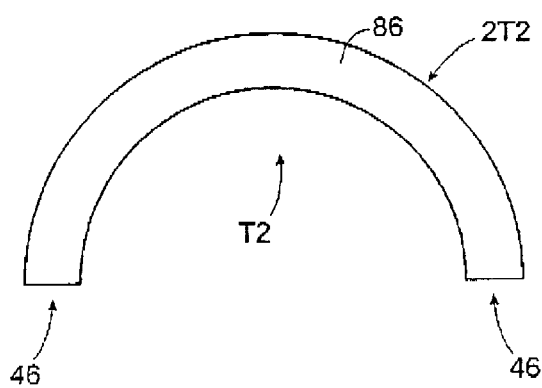
FIG. 17 is an end view of a second top half-shell element, taken from the second end thereof.
Figure 18:
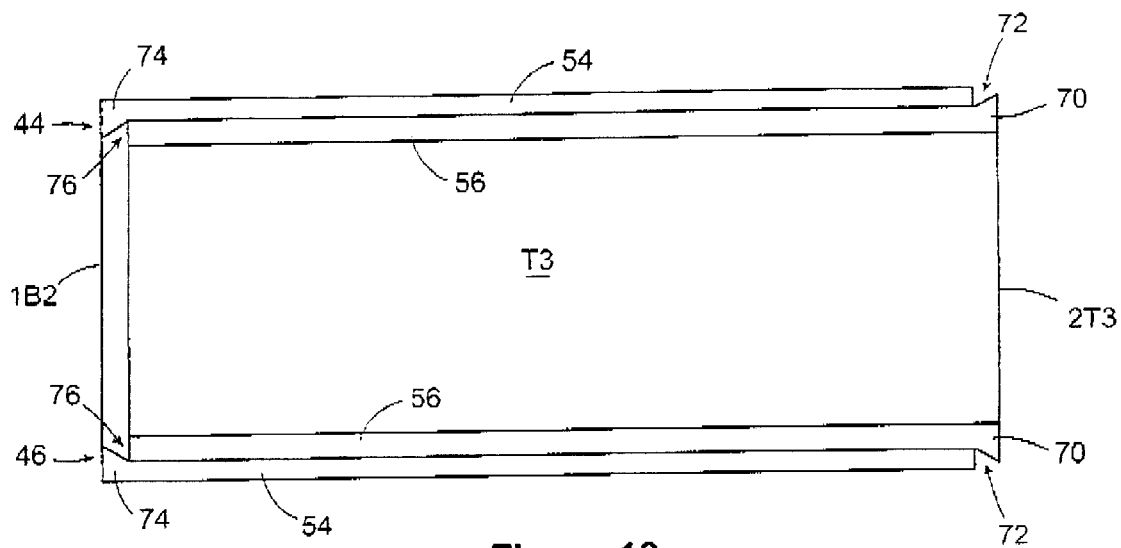
FIG. 18 is an end view of a third top half-shell element, taken from the bottom thereof.
Figure 19:
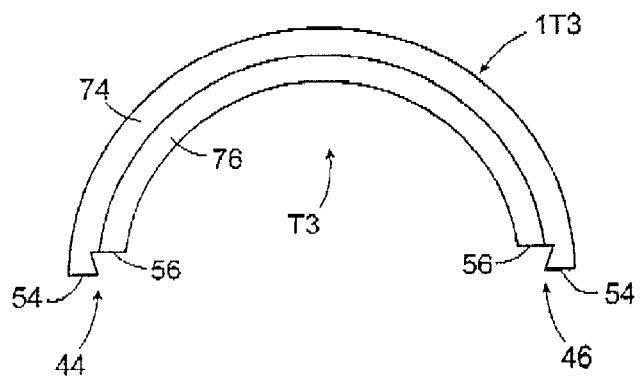
FIG. 19 is an end view of a third top half-shell element, taken from the first end thereof.
Figure 20:
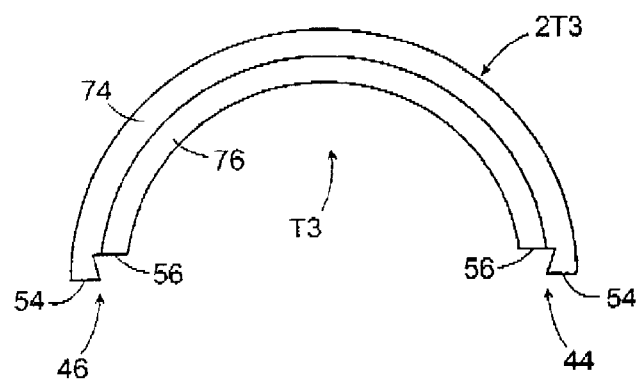
FIG. 20 is an end view of a third top half-shell element, taken from the second end thereof.

The configuration of the second top half-shell element T2 is such that at its second end 2T2, there is a stop means 86 which is provided in such a manner that it will interfere with the end 88 of the steps 50 of the first bottom half-shell element B1, this is shown in FIGS. 6, 8, and 15. By the stop means 86 interfering with the end 88 of the step 50 of the first bottom half-shell element B1, sliding motion of the second top half-shell element T2 over the first bottom half-shell element B1 is precluded beyond a position where the second end 2T2 of the second top half-shell element T2 overlies the second end 2B1 of the first bottom half-shell element B1. This relationship, and configuration, is shown in each of FIGS. 2 and 3.

It will be seen that assembly of the configuration of modular protective sleeve 10 in keeping with FIG. 2 is accomplished by first sliding the top half-shell element T1 at least partly onto the first bottom half-shell element B1, coupling the second top half-shell element T2 to the first top half-shell element T1, and then continuing to slide the two top half-shell elements T1 and T2 along the length of the first bottom half-shell element B1 until such time as the stop means 86 interferes with the end of the step 50, at 88, as discussed above. Further sliding motion to the left of the interlocked top half-shell elements T1 and T2 is thereby precluded.

Moreover, after the lanyards L1 and L2 are secured in place, as shown in FIG. 2, it is evident that tension applied to lanyard L1 will move the assembly to the left as a consequence of the tensile relationship between the elements T1 and T2 at their respective interlocked relationship as described above, and as a consequence of the interference between the stop means 86 and the end 88, which transfers the force back into the bottom half-shell element B1.

Likewise, tension applied to lanyard L2 again transfers pulling force from the ends 88 to the stop means 86, and thence through the top half-shell element T2 and its interlocked relationship with the top half-shell element T1 to that element.

Thus, motion in either direction—to the left or to the right—can be accomplished by pulling on one or the other of the lanyards L1 or L2.

As noted above, and particularly with reference to FIGS. 3, 9 to 11, and 18 to 20, additional half-shell elements may be employed to extend the length of an assembled modular protective sleeve in keeping with the present invention. Thus, the present invention provides for a plurality of second bottom half-shell elements B2, and a plurality of third top half-shell elements T3, where at least one of each is employed to increase the length of the assembled modular protective sleeve, and where equal numbers of additional second bottom half-shell elements B2 and additional third top half-shell elements T3 are employed.

Each of the at least one second bottom half-shell element B2 and the at least one third top half-shell element T3 have identical lengths. Those lengths may be the same as the length of the first bottom half-shell element B1, or they may be different, providing they are identical to each other as stated immediately above.

Once again, each of the at least one second bottom half-shell element B1 and the at least one top half-shell element T3 have respective upper and lower edges 40, 42, and 44, 46, and each has a respective semi-cylindrical configuration with walls which terminate at the respective upper and lower edges along the lengths thereof.

The stepped configuration of the upper edges of the at least one second bottom half-shell element B2 is identical to that of the first bottom half-shell element B1; and the stepped configuration of the lower edges of the at least one top half-shell element T3 are identical to those of the first and second top half-shell elements T1 and T2.

Thus, all of the bottom half-shell elements B1, and B2 and the top half-shell elements T1, T2, and T3 will nest together so as to form an elongated modular protective sleeve having a cylindrical configuration.

The interlocking relationship between the half-shell elements are identical, and as described above. Each half-shell element B2 and T3 has a male interlocking arrangement at one end, and a female interlocking arrangement at the other end, so as to establish a tensile relationship between the respective bottom half-shell elements and the respective top half-shell elements.

The assembly of a configuration of modular protection sleeve such as that shown in FIG. 3 is essentially the same as that of FIG. 2. First, a second bottom half-shell element B2 is placed into the utility duct 12, the first top half-shell element T1 is slide onto the B2 element, followed by a first T3 element which is interlocked to the T1 element. Additional B2 elements may be employed, and additional T3 elements may be employed, until such time as it is necessary to assemble the B1 and T2 elements to finalize the construction of the modular protective sleeve 10 for the job to which it is to be put.

At that time, the element B1 is interlocked to the last bottom element B2, and then the second top half-shell element T2 is interlocked to the last third top half-shell element T3 and slid into place until such time as the stop means 86 interferes with the end of the steps 50 at 88 on the element B1, as described above.

The lanyards L1 and L2 are put into place. Typically, the lanyard L1 is in place at the time that the element T1 is first assembled; and slack in the lanyard L2 may be taken up by a worker in the adjacent manhole—it being typical that workers in adjacent manholes are in radio or telephone communication one with another.

It will be understood that working in a manhole such as manhole 16 or 18 may be cramped, dirty, and dark. Accordingly, it has been found to be convenient to apply a first distinctive colour to the inner surface of the bottom half-shells, particularly the first bottom half-shell, and to the inner surfaces of the top half-shells, particularly the first and second top half-shells. The first and second distinctive colours which are applied to the bottom and top half-shell elements are mutually distinctive one from the other.

It will be recognized, of course, that the appearance of the first bottom half-shell is different than any other bottom half-shell because of the presence of the attachment means 82 for the lanyard L2. Nonetheless, a band of a third mutually distinctive colour may be applied to the outer surface of the first bottom half-shell element B1, and also to the outer surface of the second top half-shell element T2, at the respective second end 2B1 and 2T2, respectively. That third mutually distinctive colour is shown at 100 in FIGS. 2 and 3.

The presence of the colour band 100 makes it even easier to distinguish the elements B1 and T2, because they must be the last two elements which are assembled. It will also be recognized, of course, that elements T1 and T2 are shorter than any of the other elements.

Because of the necessity for the modular protective sleeve of the present invention to withstand the shock and force of being hit with a jackhammer or a sledge hammer as the concrete casing or overlay 20 is being broken, it is necessary for the modular protective half sleeve elements to be constructed of a hard and durable material. Typically, that material is steel, particularly case hardened steel; but in some circumstance, it may be aluminum so as to reduce the weight.

Also, if the modular protective sleeve is to be left in the ground for some period of time, or permanently, it may be appropriate to choose the materials from which it is made, or to apply appropriate coatings or take such other steps as may be necessary to provide cathodic protection, for example.

Thus, a modular protective sleeve in keeping with the present invention, when used over a gas line for example, or in other instances, may be constructed of a rigid and rugged plastics or ceramic material.

There has been described several embodiments of modular protective sleeve in keeping with the present invention, with specific reference to specific embodiments. It will be understood that many other configurations can be provided. For example, a placement of interlocking arrangements, and their configuration, may be different than that which is shown. The stepped arrangements of the upper and lower edges of the bottom and top half-shell elements may differ from that which is shown; and of course, either end may be provided with a male or female interlocking configuration, so long as there is consistency at least in respect of all of the bottom half-shell elements B1 and B2, and at least in respect of all of the top half-shell elements T1, T2, and T3.

Other modifications and alterations may be used in the design and manufacture of the apparatus of the present invention without departing from the spirit and scope of the accompanying claims.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

What is claimed is:

1. A modular protective sleeve for underground utilities, comprising:

a first bottom half-shell having a first length, first and second ends, and upper edges, said first bottom half-shell having a semi-cylindrical configuration with walls terminating at said upper edges along the length of said first bottom half-shell; and first and second top half-shells each having a length of one-half the length of said first bottom half-shell, first and second ends, and lower edges, each of said first and second top half-shells having a semi-cylindrical configuration with walls terminating at said lower edges along the length of each of said first and second top half-shells;

wherein the upper edges of said first bottom half-shell each have a stepped configuration, and the lower edges of each of said first and second top half-shells each have a stepped configuration in the opposite sense of the stepping of said first bottom half-shell, so that when said first and second top half-shells are placed over said first bottom half-shell, the respective stepped configuration of said upper and lower edges nest into one another so as to form a sleeve having a cylindrical configuration;

wherein said second end of said first top half-shell has a hook-like configuration so as to have a vertically directed hook and adjacent recess formed therein in a first vertical direction, and said first end of said second top half-shell has a hook-like configuration so as to have a vertically directed hook and adjacent recess formed therein in a second vertical direction opposite to said first vertical direction; so that when said second end of said first top half-shell and said first end of said second top half-shell are placed together, they nest into one another in such a manner that a tensile relationship between them may be established;

wherein attachment means for a lanyard are provided at each of said first end of said first top half-shell and said second end of said first bottom half-shell; and wherein stop means are provided at said second end of said second top half-shell in a manner so as to interfere with the end of one of the steps on each of said upper edges of said first bottom half-shell so as to preclude sliding motion of said second top half-shell over said first bottom half-shell beyond a position where the second end of said second top half-shell overlies said second end of said first bottom half-shell.

2. The modular protective sleeve of claim 1, further comprising at least one second bottom half-shell and at least one third top half-shell, where an equal number of additional second bottom half-shells and additional third top half-shells are provided;

wherein each of said at least one second bottom half-shell and each of said at least one third top half-shell have identical lengths and each has a first end, a second end, and respective upper and lower edges, each of said at least one second bottom half-shell and each of said at least one third top half-shell having a semi-cylindrical configuration with walls terminating at the respective upper and lower edges along the lengths thereof;

wherein the upper edges of each of said at least one second bottom half-shell each have a stepped configuration identical to that of said first bottom half-shell;

wherein the lower edges of each of said at least one third top half-shell each have a stepped configuration identical to those of said first and second top half-shells;

whereby, each of said first, second, and third top half-shells will nest with said first and second bottom half-shells so as to form an elongated sleeve having a cylindrical configuration; and wherein each first end of each of said first bottom half-shell and said at least one second bottom half-shell, and each first end of said at least one third top half-shell, has a hook-like configuration so as to have a vertically directed hook and adjacent recess formed therein in said first vertical direction, and each second end of each of said at least one second bottom half-shell and each second end of said at least one third top half-shell has a hook-like configuration so as to have a vertically directed hook and adjacent recess formed therein in said second vertical direction opposite to said first vertical direction; so that when any one of said at least one second bottom half-shell is assembled together with said first bottom half-shell, they nest into one another in such a manner that a tensile relationship between them may be established; and so that when any one of said at least one third top half-shell is assembled together with at least said first and second top half-shells, they nest into one another in such a manner that a tensile relationship among them may be established.

3. The modular protection sleeve of claim 1, wherein the stepped configuration of said upper edges of said first bottom half-shell, and the stepped configuration of said lower edges of said first and second top half-shells, are such that they present an interlocking relationship so as to preclude vertical separation of said first bottom half-shell away from said first and second top half-shells.

4. The modular protective sleeve of claim 2, wherein the stepped configuration of said upper edges of said first and said at least one second bottom half-shells, and the stepped configuration of the lower edges of said first, second, at least one third top half-shells, are such that they present an interlocking relationship so as to preclude vertical separation of said first and said at least one second bottom half-shells away from said first, second, and at least one third top half-shells.

5. The modular protective sleeve of claim 1, wherein a first lanyard is attached to said first end of said first top half-shell, and a second lanyard is attached to said second end of said first bottom half-shell, respectively; and wherein said modular protective sleeve may be pulled lengthwise in either of a first and second lengthwise direction by tension applied to either of said first and second lanyards, respectively.

6. The modular protective sleeve of claim 2, wherein a first lanyard is attached to said first end of said first top half-shell, and a second lanyard is attached to said second end of said first bottom half-shell, respectively; and wherein said modular protective sleeve may be pulled lengthwise in either of a first and second lengthwise direction by tension applied to either of said first and second lanyards, respectively.

7. The modular protective sleeve of claim 5, wherein each of said first and second lanyards is calibrated along its length into units of length.

8. The modular protective sleeve of claim 6, wherein each of said first and second lanyards is calibrated along its length into units of length.

9. The modular protective sleeve of claim 1, wherein said first bottom half-shell has a first distinctive color applied to the inner surface of its semi-cylindrical configuration, and wherein each of said first and second top half-shells has a second distinctive color applied to the inner surface of each respective semi-cylindrical configuration, wherein said first and second distinctive colors are mutually distinctive one from the other.

10. The modular protective sleeve of claim 9, wherein a band of a third mutually distinctive color is applied to the outer surface of the semi-cylindrical configuration of each of said first bottom half-shell and said second top half-shell, at the respective second end of each.

11. The modular protective sleeve of claim 2, wherein each of said first and said at least one second bottom half-shells has a first distinctive color applied to the inner surface of each respective semi-cylindrical configuration, and wherein each of said first, second, and at least one third top half-shells has a distinctive color applied to the inner surface of each respective semi-cylindrical configuration, wherein said first and second distinctive colors are mutually distinctive one from the other.

12. The modular protective sleeve of claim 11, wherein a band of a third mutually distinctive color is applied to the outer surface of the semi-cylindrical configuration of each of said first bottom half-shell and said second top half-shell, at the respective second end of each.

13. The modular protective sleeve of claim 1, wherein each of said first bottom half-shell, and said first and second top half-shells, is formed from a metal chosen from the group of metals consisting of steel, aluminum, plastics, and ceramics.

14. The modular protective sleeve of claim 2, wherein each of said first and said at least one second bottom half-shells, and each of said first, second, and at least one third top half-shells, is formed from a metal chosen from the group of metals consisting of steel, aluminum, plastics, and ceramics.

* * * * *